(12) United States Patent
Sullivan et al.

(10) Patent No.: US 7,547,746 B2
(45) Date of Patent: Jun. 16, 2009

(54) GOLF BALL CONTAINING CENTIPEDE POLYMERS

(75) Inventors: Michael J. Sullivan, Barrington, RI (US); Derek A. Ladd, Acushnet, MA (US)

(73) Assignee: Acushnet Company, Fairhaven, MA (US)

( * ) Notice: Subject to any disclaimer, the term of this patent is extended or adjusted under 35 U.S.C. 154(b) by 394 days.

(21) Appl. No.: 11/368,752

(22) Filed: Mar. 6, 2006

(65) Prior Publication Data

US 2006/0281588 A1 Dec. 14, 2006

Related U.S. Application Data

(63) Continuation-in-part of application No. 11/149,023, filed on Jun. 9, 2005, now abandoned, and a continuation-in-part of application No. 11/214,428, filed on Aug. 29, 2005, now Pat. No. 7,481,723.

(51) Int. Cl.
A63B 37/00 (2006.01)
C08G 81/02 (2006.01)
C08F 279/02 (2006.01)

(52) U.S. Cl. .................. 525/232; 525/313; 525/314; 525/327.6; 526/340; 528/25; 473/371; 473/374

(58) Field of Classification Search .................. None
See application file for complete search history.

(56) References Cited

U.S. PATENT DOCUMENTS

| | | | |
|---|---|---|---|
| 2,195,380 A | 3/1940 | Patrick | |
| 2,356,128 A | 8/1944 | Thomas et al. | |
| 2,466,963 A | 4/1949 | Patrick et al. | |
| 2,541,851 A | 2/1951 | Wright | |
| 3,046,248 A | 7/1962 | Molnar | |
| 3,099,644 A | 7/1963 | Parker et al. | |
| 3,225,017 A | 12/1965 | Seegman et al. | |
| 3,243,403 A | 3/1966 | Vondy et al. | |
| 3,386,963 A | 6/1968 | Santaniello | |
| 3,637,574 A | 1/1972 | Millen | |
| 3,642,728 A | 2/1972 | Canter | |
| 4,165,425 A | 8/1979 | Bertozzi | |
| 4,190,625 A | 2/1980 | Ellerstein | |
| 4,229,337 A | 10/1980 | Brenner | |
| 4,239,799 A | 12/1980 | Weinberg | |
| 4,263,078 A | 4/1981 | Millen et al. | |
| 4,371,636 A | 2/1983 | Distler et al. | |
| 4,536,310 A | 8/1985 | Agarwal et al. | |
| 4,654,396 A | 3/1987 | Bung et al. | |
| 4,683,257 A | 7/1987 | Kakiuchi et al. | |
| H363 H | 11/1987 | Duvdevani | |
| 4,829,093 A | 5/1989 | Matsukawa et al. | |
| 4,902,548 A | 2/1990 | Cholat-Serpond et al. | |
| 4,931,376 A | 6/1990 | Ikematsu et al. | |
| 4,955,613 A | 9/1990 | Gendreau et al. | |
| 4,984,803 A | 1/1991 | Llort et al. | |
| 5,037,880 A | 8/1991 | Schmidt et al. | |
| 5,082,285 A | 1/1992 | Hamada et al. | |
| 5,209,485 A | 5/1993 | Nesbitt et al. | |
| 5,299,807 A | 4/1994 | Hutin | |
| 5,316,298 A | 5/1994 | Hutin et al. | |
| 5,334,673 A | 8/1994 | Wu | |
| 5,484,870 A | 1/1996 | Wu | |
| 5,692,974 A | 12/1997 | Wu et al. | |
| 5,783,293 A | 7/1998 | Lammi | |
| 5,803,831 A * | 9/1998 | Sullivan et al. | 473/374 |
| 5,827,133 A | 10/1998 | Chang | |
| 5,833,552 A | 11/1998 | Hamada et al. | |
| 5,885,172 A | 3/1999 | Hebert et al. | |
| 5,905,116 A | 5/1999 | Wang et al. | |
| 5,919,100 A | 7/1999 | Boehm et al. | |
| 6,054,532 A | 4/2000 | Wang et al. | |
| 6,062,283 A | 5/2000 | Watanabe et al. | |
| 6,139,447 A | 10/2000 | Ohama | |
| 6,152,834 A | 11/2000 | Sullivan | |
| 6,162,135 A | 12/2000 | Bulpett et al. | |
| 6,191,217 B1 | 2/2001 | Wang et al. | |
| 6,204,354 B1 | 3/2001 | Wang et al. | |
| 6,207,763 B1 | 3/2001 | Wang et al. | |
| 6,248,825 B1 | 6/2001 | Wang et al. | |
| 6,248,827 B1 | 6/2001 | Wang et al. | |
| 6,277,920 B1 | 8/2001 | Nesbitt | |
| 6,291,592 B1 | 9/2001 | Bulpett et al. | |
| 6,315,684 B1 | 11/2001 | Binette et al. | |
| 6,322,650 B1 | 11/2001 | Gilmore et al. | |
| 6,334,919 B1 | 1/2002 | Takeyama et al. | |
| 6,342,567 B2 | 1/2002 | Minagawa | |
| 6,346,571 B1 | 2/2002 | Dharmarajan et al. | |

(Continued)

FOREIGN PATENT DOCUMENTS

JP 59157122 * 9/1984

(Continued)

OTHER PUBLICATIONS

Uhrig, "Synthesis of Combs, Centipedes and Barbwires" Macromolecules 2002, #35, p. 7182-7190.*

*Primary Examiner*—David Buttner
(74) *Attorney, Agent, or Firm*—Troy R. Lester

(57) ABSTRACT

The present invention relates generally to golf balls containing a centipede polymer in one or more core layers, one or more cover layers, one or more intermediate layers.

5 Claims, No Drawings

U.S. PATENT DOCUMENTS

| | | |
|---|---|---|
| 6,359,064 B1 | 3/2002 | Wang et al. |
| 6,369,166 B1 | 4/2002 | Wang et al. |
| 6,384,134 B1 | 5/2002 | Hall et al. |
| 6,417,259 B1 | 7/2002 | Wang et al. |
| 6,419,535 B1 | 7/2002 | Herrera |
| 6,455,626 B2 | 9/2002 | Wang et al. |
| 6,458,895 B1 | 10/2002 | Wrigley et al. |
| 6,465,578 B1 | 10/2002 | Bissonnette et al. |
| 6,506,851 B2 | 1/2003 | Wu |
| 6,578,836 B2 | 6/2003 | Kogure |
| 6,599,988 B2 | 7/2003 | Wang et al. |
| 6,719,108 B2 | 4/2004 | Hasegawa |
| 6,843,734 B2 | 1/2005 | Iwami |
| 6,849,675 B2 | 2/2005 | Sullivan |
| 2001/0005699 A1 | 6/2001 | Morgan et al. |
| 2002/0039936 A1 | 4/2002 | Binette et al. |
| 2002/0082347 A1* | 6/2002 | Takesue et al. ............... 525/78 |
| 2002/0188064 A1 | 12/2002 | Wang et al. |
| 2003/0069082 A1 | 4/2003 | Sullivan |
| 2003/0083435 A1* | 5/2003 | Ichikawa et al. ............. 525/89 |
| 2003/0091527 A1 | 5/2003 | Wang et al. |
| 2004/0236030 A1* | 11/2004 | Kim et al. ............... 525/329.9 |

FOREIGN PATENT DOCUMENTS

| | | |
|---|---|---|
| WO | WO 00/23519 | 4/2000 |
| WO | WO 00/29129 | 5/2000 |

* cited by examiner

GOLF BALL CONTAINING CENTIPEDE POLYMERS

CROSS-REFERENCE TO RELATED APPLICATIONS

This patent application is a continuation-in-part of U.S. patent application Ser. No. 11/149,023, filed Jun. 9, 2005, now abandoned. This patent application is also a continuation-in-part of U.S. patent application Ser. No. 11/214,428, filed Aug. 29, 2005 now U.S. Pat. No 7,481,723. The disclosures of both these applications are incorporated by reference herein in their entirety.

FIELD OF THE INVENTION

The present invention relates generally to golf balls containing a centipede polymer in one or more layers of the golf ball.

BACKGROUND OF THE INVENTION

Conventional golf balls can be divided into two general classes: solid and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by a tensioned elastomeric material, and a cover. It is also possible to surround a hollow or fluid-filled center with a plurality of solid layers. Solid balls have traditionally been considered longer and more durable than wound balls, but conventional solid constructions lack the "feel" provided by the wound construction.

By altering ball construction and composition, manufacturers have been able to vary a wide range of playing characteristics, such as compression, velocity, "feel," and spin, optimizing each or all for various playing abilities. In particular, a variety of core and cover layer(s) constructions, such as multi-layer balls having dual cover layers and/or dual core layers, have been investigated and now allow many non-wound balls to exhibit characteristics previously not maintainable in a solid-construction golf ball. These golf ball layers are typically constructed with a number of polymeric compositions and blends, including polybutadiene rubber, polyurethanes, polyamides, and ethylene-based ionomers.

Ionomers, and in particular ethylene-co-$\alpha,\beta$-ethylenically unsaturated carboxylic acid copolymers or a melt processable ionomer thereof, are a preferred polymer for many golf ball layers. One problem encountered with the use of ionomers as stiff layers, however, is the unprocessability of the material as the percent of neutralization of the acid group increases. Ionomers are stiffened by increasing the amount of neutralization by a metal cation or a salt thereof. Once the percent of neutralization is greater than about 60% (depending on metal cation selected), the melt flow of the ionomer becomes low and the ease of processability decreases. For tri-valent cations, the percent neutralization at which the polymer becomes unprocessable can be significantly lower.

The core of solid golf balls is the "engine" of the ball, providing the velocity required for good distance. Too hard a core, however, can result in a golf ball that provides poor feel. Manufacturers have been experimenting with various core compositions and constructions in an effort to optimize both feel and distance. Most conventional solid cores comprise polybutadiene rubber ("BR") or some modified form thereof, which provides the primary source of resiliency for the golf ball.

Familiar to those skilled in the golf ball art, the coefficient of restitution ("COR") along with angle of trajectory (i.e., launch angle) and clubhead speed, among other factors, can determine the distance a golf ball will travel when hit by a golf club. One way to measure the COR is to propel a ball at a given speed against a hard massive surface and measure its incoming and outgoing velocity. The COR is the ratio of the outgoing velocity to the incoming velocity and is expressed as a decimal between zero and one. There is no United States Golf Association limit on the COR of a golf ball, but the initial velocity of the golf ball is controlled.

In general, BR's of high molecular weight (high Mooney viscosity) have better resilience than BR's of low molecular weight (low Mooney viscosity). However, as the molecular weight increases, the milling and processing properties of the BR deteriorate. BR catalyzed with lanthanide series elements such as neodymium tends to be linear and narrow in polydispersity (close to 1.0). The narrow polydispersity allows high-molecular weight Nd-BR of to process readily, but the linearity may cause problems in extrusion processes such as die swell and cold flow. BR catalyzed with cobalt and/or nickel, in comparison to Nd-BR, tends to be more branched and have wider polydispersity (distant from 1.0). While the branching characteristic facilitates processing, the wide polydispersity generally gives low resilience. Advantageously, blends of Co/Ni-BR and Nd-BR in core compositions enhance resilience in the resulting golf balls.

Attempts to improve golf ball COR by using various blends of BR in core compositions include, among others, U.S. Pat. Nos. 4,683,257; 4,931,376; 4,955,613; 4,984,803; 5,082,285; 6,139,447; 6,277,920; and 6,315,684. Although some of the core compositions described in these disclosures are satisfactory, a need remains for compositions with improved properties and processability to form golf balls.

SUMMARY OF THE INVENTION

The present invention relates to a golf ball comprising one or more core layers, one or more cover layers and optionally one or more intermediate layers, which can be a velocity-reducing layer or water vapor barrier layer. At least one of the one or more core layers, the one or more cover layers, and the one or more optional intermediate layers comprises a centipede polymer. The centipede polymer can be an ionomeric polymer or a non-ionomeric polymer. For example, the centipede polymer may comprise a poly(alkenyl-co-maleimide) copolymer ionomer. The ionomeric centipede polymer may exhibit a tangent $\delta$ of at least about 0.1 and more preferably from about 0.1 to about 0.6. In another example, the non-ionomeric centipede polymer may comprise poly(isoprene-g-styrene) centipede polymer.

It is to be understood that both the foregoing general description and the following detailed description are exemplary and explanatory only, and are intended to provide a further explanation of the present invention as claimed.

DETAILED DESCRIPTION OF THE INVENTION

One aspect of the present invention involves a golf ball containing a centipede polymer in one or more of the layers of the golf ball, e.g., in one or more core layers, one or more cover layers, one or more intermediate (e.g., vapor barrier layer, filled layer, velocity-reducing layer, etc.) layers between the one or more cover layers and the one or more core layers, or some combination thereof. In some embodiments, the centipede polymer is present in only one layer. In other embodiments, the centipede polymer is present in more than one layer. In one embodiment, one or more of the layers of the golf ball contains at least about 5% of a centipede polymer, based on the weight of the (each) layer.

In a preferred embodiment, the centipede polymer is present in one or more cover layers. In another embodiment in which the golf ball according to the invention has two or more cover layers, the centipede polymer can be present in any of the cover layers. In another preferred embodiment, the centipede polymer is present in one or more core layers. In another embodiment in which the golf ball according to the invention has two or more core layers, the centipede ionomer can be present in any of the core layers.

As used herein, the term "centipede" polymer should be understood to mean a (co)polymer, which has a backbone containing optionally some diluent monomers and at least some graftable monomers having a functional group capable of being attached to relatively short pendant graft moieties via chemical reaction, and which has multiple relatively short graft moieties chemically attached to at least a portion of the functional groups of the graftable monomers.

As used herein, the term "relatively short", with reference to graft moieties, should be understood to mean that, for polymer backbones having a length and/or molecular weight greater than about the entanglement length/molecular weight (i.e., for the purposes of this disclosure, this is assumed to be at least about 100 repeat units), the graft moieties each have a length and/or molecular weight less than their entanglement length/molecular weight. In one embodiment, the term "relatively short", with reference to graft moieties, means that the average length and/or weight of the graft moieties, prior to attachment to the polymer backbone, is not more than about 8%, preferably not more than about 5%, more preferably not more than about 3% of the respective length and/or weight of the polymer backbone.

Centipede polymers according to the invention can be ionomers or non-ionomers. Also as used herein, the term "ionomer" should be understood to mean a (co)polymer containing multiple functional groups, each capable of forming a salt and/or a charged moiety under conditions of synthesis, fabrication, formulation, and/or use. For instance, in a copolymer containing multiple carboxylic acid functional groups pendant from a polymer backbone, an ionomer can be formed when the acidic hydrogens of at least some of the carboxylic acid groups are stripped to form negatively-charged carboxylate ions and/or are replaced with inorganic (e.g., metal), organic, and/or organometallic counterions to form carboxylate salts.

Non-ionomeric centipede polymers useful in the golf balls according to the invention can advantageously include polymers having a relatively soft backbone and relatively hard grafts, polymers having a relatively flexible backbone and relatively rigid grafts, polymers having a relatively elastic/elastomeric backbone and relatively inelastic/non-elastomeric grafts, or the like, or a combination thereof. Examples of non-ionomeric centipede polymers can include, but are not limited to, poly(isoprene-g-styrene)s, poly(butadiene-g-styrene)s, poly(isobutylene-g-styrene)s, poly(ethylene-co-propylene-g-styrene)s, poly(isoprene-g-alkylstyrene)s, poly(butadiene-g-alkylstyrene)s, poly(isobutylene-g-alkylstyrene)s, poly(ethylene-co-propylene-g-alkylstyrene)s, poly(isoprene-g-vinylpyridine)s, poly(butadiene-g-vinylpyridine)s, poly(isobutylene-g-vinylpyridine)s, poly(ethylene-co-propylene-g-vinylpyridine)s, and the like, and combinations thereof.

A preferred non-ionomeric centipede polymer comprises a polyisoprene (PI) backbone and polystyrene (PS) branches. These polymers can be synthesized by high vacuum anionic polymerization techniques. Additionally, the PI backbone can carry one or two PS branches at each branch point. It is known that such PI/PS centipede non-ionomeric polymer, which contains at least 22% PS by volume and seven branch points, are thermoplastic elastomers and has relatively high strain at break of about 2100%, which is considerably higher than commercially available thermoplastic elastomers, such as Kraton®. Non-ionomeric centipede polymers can be incorporated into any portion of the golf ball, preferably in an outer core layer, an intermediate layer or an inner cover layer.

Examples of centipede ionomers useful in the golf balls according to the invention can include, but are not limited to, those disclosed in U.S. Patent Application Publication No. 2002/0188064 A1, which is incorporated by reference herein in its entirety, and those that are commercially available from Bridgestone/Firestone Corp. of Akron, Ohio. Additionally or alternately, other examples of centipede ionomers useful in the golf balls according to the invention can include, but are not limited to, those disclosed in U.S. Patent Application Publication No. 2003/0091527 A1 and U.S. Pat. Nos. 6,599,988, 6,455,626, 6,417,259, 6,384,134, 6,369,166, 6,359,064, 6,248,827, 6,248,825, 6,207,763, 6,204,354, 6,191,217, 6,054,532, and 5,905,116, the disclosures of each of which are incorporated herein by reference in their entirety.

In one embodiment, the centipede ionomer according to the invention comprises a poly(alkenyl-co-maleimide) copolymer having functional groups that are at least partially neutralized with an inorganic salt. Poly(alkenyl-co-maleimide)s that are completely non-neutralized can be considered non-ionomeric centipede polymers herein.

In another embodiment, the centipede ionomers comprise a poly(alkenyl-co-maleimide) having diene rubber grafts such as those disclosed in U.S. Pat. No. 6,353,054, the contents of which are hereby incorporated by reference herein.

As used herein, the term "alkenyl" should be understood to mean any monomer having an ethylenic unsaturation that is polymerizable, and specifically co-polymerizable with an ethylenically unsaturated dicarboxylic acid and/or anhydride (e.g., maleic acid, maleic anhydride, itaconic acid, itaconic anhydride, glutaconic acid, fumaric acid, crotonic anhydride, or the like). Dicarboxylic acids, as referred to herein, need not be present in their diacid form, but can be present, additionally or alternatively, as partially and/or completely neutralized organic/inorganic salts of the acid forms. For instance, alkenyl monomers according to the invention can include, but are not limited to, styrene, α-alkylstyrenes, vinyl naphthalenes, vinyl α-alkylnaphthalenes, alkyl vinyl ethers, alkyl and/or dialkyl ethylenes having the general formula $CH_2=CR_1R_2$ (where $R_1$ and $R_2$ are each independently hydrogen or an alkyl moiety containing from about 1 to about 20 carbons, thus including ethylene itself), and the like, and combinations and copolymers thereof. As used herein, the term and/or prefix "alkyl" should be understood to mean a straight or branched, saturated hydrocarbon moiety containing from about 1 to about 20 carbons.

As used herein, the term "monomer" means any unit that is polymerized to form a polymer and includes, but is not limited to, monomers, dimers, oligomers, and/or macromonomers. As used herein, the terms "polymer," "polymers," and "polymeric" are generic to macromolecules containing repeat units and include, but are not limited to, oligomers, homopolymers, copolymers, including random copolymers, statistical copolymers, alternating copolymers, periodic copolymer, bipolymers, terpolymers, quaterpolymers, and other forms of copolymers, as well as adducts thereof, substituted derivatives thereof, and combinations thereof. Such polymers can be linear, branched, hyper-branched, crosslinked, block, di-block, multi-block, graft, isotactic, syndiotactic, stereoregular, atactic, gradient, multi-arm star, comb, dendritic, and/or any combination thereof.

As used herein, the term "maleimide" is not limited to imides formed from maleic acid or maleic anhydride, but should be understood to represent a repeat unit formed from a monomer having a pendant functionality of a dicarboxylic acid and/or anhydride that can be and/or has been reacted with a nitrogen-containing moiety to form an imide group in which the nitrogen atom of the moiety is chemically linked to the two carbonyls of the diacid/anhydride. Additionally or alternately, the term "maleimide" can represent a repeat unit formed from a set of two monomers, each having a carboxylic acid functional group, located spacially in proximity to one another such that the nitrogen atom of a nitrogen-containing moiety can be and/or has been reacted with both carboxylic acid groups to form an imide group. In a preferred embodiment, the nitrogen-containing moiety is a compound containing a primary amine functionality.

The centipede ionomers according to the invention can be used as damping materials and vibration resistant materials, because of their high degree of energy absorption, which is typically accompanied by good mechanical properties and thermal stability, among other reasons. This energy absorption can be conveniently probed via the damping parameter tan δ, which can be quantified using a forced oscillation applied to a material at frequency, with the transmitted force and phase shift being measured. The phase shift angle, δ, can be recorded. The value of tan δ is typically proportional to the ratio of energy dissipated to energy stored. The measurement can be made by any of several commercial testing devices (e.g., dynamic mechanical thermal analyzer, torsional viscometer, etc.), and may be made by a sweep of frequencies at a fixed temperature, then by repeating that sweep at several other temperatures, followed by formation of a master curve of tan δ vs. frequency by curve alignment (e.g., via time-temperature superposition). An alternate measurement method is to measure tan δ at constant frequency, such as 5 Hz, over a range of temperatures, followed by formation of a different master curve). Centipede ionomer compositions produced according to the present invention generally have high damping properties, with tan δ values of at least about 0.1, and usually from about 0.1 to about 0.6, or even higher, over the temperature of about 20° C. to about 50° C.

In some embodiments, where some level of dampening characteristics are sought in one or more layers of the golf ball according to the invention, the centipede ionomers described herein (and particularly those centipede ionomers disclosed in U.S. Patent Application Publication No. 2002/0188064 A1, whose disclosure is incorporated herein by reference) can be used, alone or in combination with one or more other low-resilience polymer materials, such as those described in commonly-assigned co-pending U.S. patent application Ser. No. 11/214,428, filed Aug. 29, 2005, and entitled "High Performance Golf Ball Having A Reduced-Distance," the entire disclosure of which is hereby incorporated by express reference hereto. Damping centipede ionomers can also be used as inserts in golf clubs to attenuate the vibrations caused by impacts with golf balls.

The centipede ionomers useful in the golf balls according to the invention can have a wide range of properties, depending upon the specific chemistry of the ionomers and on any compositional additives. Nevertheless, typical flexural moduli for these centipede ionomers can be in the range of about 500 kpsi to about 100,000 kpsi, preferably from about 1,000 kpsi to about 60,000 kpsi. Typical hardness values for these centipede ionomers can also be less than about 70 Shore D, preferably less than about 60 Shore D, more preferably less than about 50 Shore D. Further, these centipede ionomers can generally be relatively elastic (e.g., at least about 300% elongation at break, more preferably at least about 500% elongation at break, when elongated at about room temperature, or about 23° C.), as well as typically having a relatively high toughness and a relatively high tear strength.

The centipede polymers according to the invention can be thermoplastic or thermosetting. In embodiments where the centipede polymers are thermosetting, a crosslinking agent will typically be present. In one embodiment, the crosslinking agent can be a diamine compound, such as those containing two primary amine functionalities, e.g., which can crosslink the polymers via each primary amine reacting with each of two distinct dicarboxylic acid and/or anhydride groups, typically on different polymer backbones.

An extender is a compositional additive that can be combined with the centipede polymer composition during processing to yield a thermoreversible elastomeric composition. After being extended, the polymer composition may be a gel-like material that is elastic, thermally recyclable, and high damping. In addition, it can advantageously have high mechanical strength.

Suitable extenders include, but are not limited to, extender oils and low molecular weight compounds or components, such as the extenders including one or more of softening agents, plasticizers, tackifiers, oligomers, lubricants, petroleum hydrocarbons, silicone oil, aromatic oil, naphthenic oil, and paraffinic oils. In some embodiments, the extenders can include various oils such as paraffinic oils. When used, the final polymer compositions may contain between about 10% and about 50% by weight, for example between about 25% and about 40% by weight, of one or more extenders.

Additionally or alternately, additives such as stabilizers, antioxidants, reinforcing agents, reinforcing resins, pigments, and fragrances may also be utilized in the present compositions. Specific examples of useful antioxidants and stabilizers include 2-(2'-hydroxy-5'-methylphenyl) benzotriazole, nickel di-butyl-di-thiocarbamate, zinc di-butyl-di-thiocarbamate, tris(nonylphenyl) phosphite, 2,6-di-t-butyl-4-methylphenol, and the like. Exemplary conventional fillers and pigments include silica, carbon black, $TiO_2$, $Fe_2O_3$, and the like. These compounding ingredients are incorporated in suitable amounts depending upon the contemplated use of the product, preferably in the range of about 1 to about 350 parts by weight of additives or compounding ingredients per 100 parts of the polymer composition.

A reinforcing material may be defined as a material added to a polymer matrix to improve the strength of the polymer composition. Most reinforcing materials are inorganic or organic products of high molecular weight. Various examples of reinforcing materials can include, but are not limited to, glass fibers, asbestos, boron fibers, carbon and graphite fibers, whiskers, quartz and silica fibers, ceramic fibers, metal fibers, natural organic fibers, and synthetic organic fibers. Other elastomers and resins can also be useful to enhance specific properties such as damping behavior, adhesion, processability, and the like. In this case, the foregoing materials are equally applicable to the instant centipede polymer compositions.

The centipede polymers according to the invention can be used alone in one or more layers, or may be blended with one or more other polymeric/oligomeric components in any given layer. In one embodiment, the centipede polymers according to the invention can be blended with highly neutralized polymers and blends thereof ("HNP") in a ball core, intermediate layer, and/or cover. The acid moieties of the HNP's, typically ethylene-based ionomers, are preferably neutralized greater than about 70%, more preferably greater than about 90%, and most preferably at least about 99%, for example about 100% or completely neutralized. The HNPs and centipede polymers, in some embodiments, can be also be blended with a third polymer component, which, if containing an acid group, may be neutralized in a conventional manner, by organic fatty acids, or both. In alternate embodiments, the third polymer component can be blended with the centipede polymers according to the invention in the absence of HNPs. The third polymer component, which may be partially or fully neutralized, preferably comprises ionomeric copolymers/terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

In one embodiment of the present invention, the HNP's are ionomers and/or their acid precursors that are preferably neutralized, either filly or partially, with organic acid copolymers or the salts thereof. The acid copolymers preferably include an α-olefin such as ethylene, a $C_3$-$C_8$ α,β-ethylenically unsaturated carboxylic acid such as acrylic and/or methacrylic acid, and copolymers thereof. They may optionally contain a softening monomer, such as a $C_1$-$C_8$ alkyl acrylate and/or a $C_1$-$C_8$ alkyl methacrylate.

The acid copolymers can be described as E/X/Y copolymers where E is ethylene, X is an α,β-ethylenically unsaturated carboxylic acid, and Y is a softening comonomer. In a preferred embodiment, X is acrylic and/or methacrylic acid, and Y is a $C_1$-$C_8$ alkyl acrylate and/or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

Specific acid-containing ethylene copolymers can include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers can include ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. The most preferred acid-containing ethylene copolymers are ethylene/(meth) acrylic acid/n-butyl, acrylate, ethylene/(meth)acrylic acid/ethyl acrylate, and ethylene/ (meth) acrylic acid/methyl acrylate copolymers.

HNP ionomers are typically neutralized with a metal cation, such as Li, Na, Mg, or Zn. It has been found that by adding sufficient organic acid or salt of organic acid, along with a suitable base, to the acid copolymer or ionomer, however, the ionomer can be neutralized, without losing processability, to a level much greater than for a metal cation. Preferably, the acid moieties are neutralized greater than about 80%, preferably from about 90 to about 100%, most preferably about 100%, without losing processability. This accomplished by melt-blending an ethylene-co-α,β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than about 90%, (preferably to about 100%).

The organic acids are typically aliphatic, mono-functional (saturated, unsaturated, or polyunsaturated) organic acids. Salts of these organic acids may also be employed. The salts can include, but are not limited to, the salts of barium, lithium, sodium, zinc, bismuth, chromium, cobalt, copper, potassium, strontium, titanium, tungsten, magnesium, cesium, iron, nickel, silver, aluminum, tin, and/or calcium, as well as salts of fatty acids, particularly stearic, bebenic, erucic, oleic, linoleic, and/or dimerized derivatives thereof, and combinations thereof. It is preferred that the organic acids/salts be relatively non-migratory (i.e., not bloom to the surface of the polymer under ambient temperatures) and non-volatile (i.e., not volatilize at temperatures required for melt-blending).

The HNP ionomers may also be partially neutralized with metal cations. The acid moiety in the acid copolymer can be neutralized from about 1% to about 100%, preferably from at least about 40% to about 100%, and more preferably from at least about 90% to about 100%, to have a counterion such as lithium, sodium, potassium, magnesium, calcium, barium, lead, tin, zinc, aluminum, or a mixture thereof.

The acid copolymers can advantageously be prepared from 'direct' acid copolymers, copolymers polymerized by adding all monomers simultaneously, or by grafting of at least one acid-containing monomer onto an existing polymer.

In one embodiment where the centipede polymers are present in one or more cover layers and are blended with an other polymeric component therein, the other polymeric component can include a polyurethane, a polyurethane ionomer, a polyurea, a polyurethaneurea, an epoxy resin, or a combination thereof. In this embodiment, the centipede polymers can advantageously be crosslinked (thermosetting). In another embodiment where the centipede polymers are present in one or more cover layers and are blended with an other polymeric component therein, the other polymeric component can include an acrylic ionomer such as those commercially available from E.I. DuPont de Nemours & Co., of Wilmington, Del., under the tradename SURLYN®, and/or those commercially available from ExxonMobil of Baytown, Tex., under the tradenames IOTEK® and ESCOR®.

The core of the golf ball according to the invention can contain a single (typically spherical) layer called the ball center (because of its location roughly at the center of the golf ball), or may contain additional (typically concentric) core layers surrounding the ball center.

The core layer(s) of the golf ball according to the invention may comprise thermosetting or thermoplastic materials such as polyurethane, polyurea, centipede ionomers, partially or fully neutralized ionomers, thermosetting polydiene rubber such as polybutadiene, polyisoprene, ethylene propylene diene monomer rubber, ethylene propylene rubber, natural rubber, balata, butyl rubber, halobutyl rubber, styrene butadiene rubber, or any styrenic block copolymer such as styrene ethylene butadiene styrene rubber, etc., metallocene or other single site catalyzed polyolefin, polyurethane copolymers, e.g. with silicone, and the like, and combinations, blends, and/or copolymers thereof.

In addition to the materials discussed above, compositions within the scope of the present invention can incorporate one or more polymers. Examples of suitable additional polymers for use in the present invention include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, metallocene catalyzed polymers, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane or any metallocene-catalyzed polymers of these species. Suitable polyamides for use as an additional material in compositions within the scope of the present invention also include resins obtained by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine or decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46.

Other preferred materials suitable for use as an additional material in compositions within the scope of the present invention include polyester elastomers marketed under the tradename SKYPEL by SK Chemicals of South Korea, or diblock or triblock copolymers marketed under the tradename SEPTON by Kuraray Corporation of Kurashiki, Japan, and KRATON by Kraton Polymers Group of Companies of Chester, United Kingdom. All of the materials listed above can provide for particular enhancements to ball layers prepared within the scope of the present invention.

Materials for solid cores typically include compositions having a base rubber, a filler, an initiator agent, and a crosslinking agent. The base rubber typically includes natural or synthetic rubber, such as polybutadiene rubber. A preferred base rubber is 1,4-polybutadiene having a cis-structure of at least 40%. Most preferably, however, the solid core is formed of a resilient rubber-based component comprising a high-Mooney-viscosity rubber and a crosslinking agent.

Another suitable rubber from which to form cores of the present invention is trans-polybutadiene. One method of forming this polybutadiene isomer is by converting the cis-isomer of the polybutadiene to the trans-isomer during a molding cycle. Various combinations of polymers, cis-to-trans catalysts, fillers, crosslinkers, and a source of free radicals, may be used. A variety of methods and materials for performing the cis-to-trans conversion have been disclosed in U.S. Pat. No. 6,162,135 and U.S. application Ser. No. 09/461,736, filed Dec. 16, 1999; Ser. No. 09/458,676, filed Dec. 10, 1999; and Ser. No. 09/461,421, filed Dec. 16, 1999, each of which are incorporated herein, in their entirety, by reference.

Additionally, without wishing to be bound by any particular theory, it is believed that a low amount of 1,2-polybutadiene isomer ("vinyl-polybutadiene") is preferable in the initial polybutadiene to be converted to the trans-isomer. Typically, the vinyl polybutadiene isomer content is less than about 7 percent, more preferably less than about 4 percent, and most preferably, less than about 2 percent.

Fillers added to one or more portions of the golf ball typically include processing aids or compounds to affect rheological and mixing properties, the specific gravity (i.e., density-modifying fillers), the modulus, the tear strength, reinforcement, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents, zinc carbonate, regrind (recycled core material typically ground to about 30 mesh or less particle size), high-Mooney-viscosity rubber regrind, and the like. Polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or any or all core and cover layers, if present.

The initiator agent can be any known polymerization initiator which decomposes during the cure cycle. Suitable initiators include peroxide compounds such as dicumyl peroxide, 1,1-di(t-butylperoxy) 3,3,5-trimethyl cyclohexane, a-a bis(t-butylperoxy) diisopropylbenzene, 2,5-dimethyl-2,5di (t-butylperoxy) hexane or di-t-butyl peroxide and mixtures thereof.

Crosslinkers can advantageously be included to increase the hardness and resilience of the reaction product. The crosslinking agent includes a metal salt of an unsaturated fatty acid such as a zinc salt or a magnesium salt of an unsaturated fatty acid having about 3 to about 8 carbon atoms such as acrylic and/or methacrylic acid. Suitable crosslinking agents include metal salt diacrylates, dimethacrylates, and monomethacrylates, in which the metal is magnesium, calcium, zinc, aluminum, sodium, lithium, or nickel. Preferred acrylates include zinc acrylate, zinc diacrylate, zinc methacrylate, zinc dimethacrylate, and mixtures thereof.

The crosslinking agent must be present in an amount sufficient to crosslink a portion of the chains of polymers in the resilient polymer component. This may be achieved, for example, by altering the type and amount of crosslinking agent, a method well-known to those of ordinary skill in the art.

In another embodiment of the present invention, the core comprises a solid center and at least one outer core layer. When the optional outer core layer is present, the center preferably comprises a high-Mooney-viscosity rubber and a crosslinking agent present in an amount from about 10 to about 30 parts per hundred of the rubber, preferably from about 19 to about 25 parts per hundred of the rubber, and most preferably from about 20 to about 24 parts crosslinking agent per hundred of rubber.

The core composition should comprise at least one rubber material having a resilience index of at least about 40. Preferably, the resilience index is at least about 50. Polymers that produce resilient golf balls and, therefore, are suitable for the present invention, include but are not limited to CB23, CB22, BR60, and 1207G.

Additionally, the unvulcanized rubber, such as polybutadiene, in golf balls prepared according to the invention typically has a Mooney viscosity of between about 40 and about 80, more preferably, between about 45 and about 60, and most preferably, between about 45 and about 55. Mooney viscosity is typically measured according to ASTM D-1646.

The polymers, free-radical initiators, filler, crosslinking agents, and any other materials used in forming either the golf ball center or any portion of the core, in accordance with invention, may be combined to form a mixture by any type of mixing known to one of ordinary skill in the art. Suitable types of mixing include single pass and multi-pass mixing, and the like. The crosslinking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added sequentially.

Suitable mixing equipment is well known to those of ordinary skill in the art, and such equipment may include a Banbury mixer, a two-roll mill, or a twin screw extruder. Conventional mixing speeds for combining polymers are typically used, although the speed must be high enough to impart substantially uniform dispersion of the constituents. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the polymer component. Also, too high a mixing speed may undesirably result in creation of enough heat to initiate the crosslinking before the preforms are shaped and assembled around a core. The mixing temperature depends upon the type of polymer components, and more importantly, on the type of free-radical initiator. Additionally, it is important to maintain a mixing temperature below the peroxide decomposition temperature. Suitable mixing speeds and temperatures are well-known to those of ordinary skill in the art, or may be readily determined without undue experimentation.

The mixture can be subjected to compression or injection molding processes, for example, to obtain solid spheres for the core or hemispherical shells for forming an intermediate layer, such as an outer core layer or an inner cover layer. The polymer mixture is subjected to a molding cycle in which heat and pressure are applied while the mixture is confined within a mold. The cavity shape depends on the portion of the golf ball being formed. The molding cycle may have a single step of molding the mixture at a single temperature for a fixed time duration. The molding cycle may also include a two-step process, in which the polymer mixture is held in the mold at an initial temperature for an initial duration of time, followed by holding at a second, typically higher temperature for a second duration of time. In a preferred embodiment, a single-step cure cycle is employed. Single-step processes are effective and efficient, reducing the time and cost of a two-step process.

Further, the core and layers of the present invention may be reaction injection molded ("RIM"), liquid injection molded ("LIM"), or injection molded. In the most preferred embodiment, the layers of the present invention are reaction injection molded. In the RIM process, at least two or more reactive low viscosity liquid components are mixed by impingement and injected under high pressure (1200 psi or higher) into an open or closed mold. The reaction times for the RIM systems are much faster than the low pressure mixing and metered machines and, consequently, the raw materials used for the RIM process are generally much lower in viscosity to allow intimate mixing. A RIM machine can process fast reacting materials having viscosities up to about 2,000 cP and a pot life of less than about 5 seconds. Because low viscosity materials are used in the RIM process, the components are capable of being mixed by impingement in less than a second before injecting the mixed material into the closed mold at about 2,000 to about 2,500 psi. With a conventional castable urethane process, materials having viscosities greater than about 3,500 are required and also require a pot life of greater than about 35 seconds.

The polybutadiene, cis-to-trans conversion catalyst, if present, additional polymers, free-radical initiator, filler, and any other materials used in forming any portion of the golf ball core, in accordance with the invention, may be combined to form a golf ball layer by an injection molding process, which is also well-known to one of ordinary skill in the art. Although the curing time depends on the various materials selected, those of ordinary skill in the art will be readily able to adjust the curing time upward or downward based on the particular materials used and the discussion herein.

The golf ball according to the invention typically has at least two cover layers, thus including at least an inner/innermost cover layer and an outer/outermost cover layer. In these golf balls, the inner/innermost cover layer can include one or more polymeric materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates, in particular PPDI-based thermoplastic polyurethanes, and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN®, polyethylene, ethylene copolymers, ethylene-propylene-non-conjugated diene terpolymer, and the like;

(6) Acrylic resins and blends of these resins with poly vinyl chloride, elastomers, and the like;

(7) Thermoplastics, such as urethane; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by ELF Atochem of Philadelphia, Pa.;

(8) Polyphenylene oxide resins or blends of polyphenylene oxide with high impact polystyrene as sold under the trademark NORYL® by General Electric Company of Pittsfield, Mass.;

(9) Thermoplastic polyesters, such as polyethylene terephthalate, polybutylene terephthalate, polyethylene terephthalate/glycol modified, poly(trimethylene terephthalate), and elastomers sold under the trademarks HYTREL® by E.I. DuPont de Nemours & Co. of Wilmington, Del., and LOMOD® by General Electric Company of Pittsfield, Mass.;

(10) Centipede ionomers according to the invention;
(11) Non-ionomeric centipede polymers according to the invention;
(12) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and
(13) Blends of thermoplastic rubbers with polyethylene, propylene, polyacetal, nylon, polyesters, cellulose esters, and the like.

In one embodiment, the inner/innermost cover layer includes polymers such as ethylene, propylene, 1-butene or 1-hexane based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(vinyl alcohol), poly(tetrafluoroethylene) and their copolymers including functional comonomers, and blends and copolymers thereof. Suitable cover compositions can additionally or alternately include a centipede ionomer, a non-ionomeric centipede polymer, a polyether or polyester thermoplastic urethane, a thermoset polyurethane, a low modulus ionomer such as an acid-containing ethylene copolymer ionomer, including E/X/Y terpolymers where E is ethylene, X is an acrylate and/or methacrylate-based softening comonomer present in about 0 to 50 weight percent, and Y is acrylic and/or methacrylic acid present in about 5 to 35 weight percent. In a low spin rate embodiment designed for maximum distance, the acrylic and/or methacrylic acid can preferably be present in about 16 to 35 weight percent, making the ionomer a high modulus ionomer. In a higher spin embodiment, the inner cover layer can advantageously include an ionomer where an acid is present in about 10 to 15 weight percent and includes a softening comonomer. Additionally, high-density polyethylene ("HDPE"), low-density polyethylene ("LDPE"), LLDPE, and polyolefin polymers are suitable for a variety of golf ball layers.

Any cover layer, but preferably the outer/outermost cover layer, may include a polyurethane composition comprising the reaction product of at least one polyisocyanate, polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("H12MDI"); p-phenylene diisocyanate ("PPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; and mixtures thereof.

Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

In a preferred embodiment, the at least one polyisocyanate should have less than about 14% unreacted NCO groups. Preferably, the at least one polyisocyanate has no greater than about 7.5% NCO, and more preferably, less than about 7.0%.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Suitable polyester polyols include, but are not limited to, polyethylene adipate glycol, polybutylene adipate glycol, polyethylene propylene adipate glycol, o-phthalate-1,6-hexanediol, and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Suitable polycarbonates include, but are not limited to, polyphthalate carbonate. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-diamino-3,3'-diethyl-5,5'-dimethyl diphenylmethane; 2,2', 3,3'-tetrachloro diamino diphenylmethane; 4,4'-methylene-bis-(3-chloro-2,6-diethylaniline); trimethylene glycol di-p-aminobenzoate; and mixtures thereof. Preferably, the curing agent of the present invention includes 3,5-dimethylthio-2,4-toluenediamine and isomers thereof, such as ETHACURE 300™, commercially available from Albermarle Corporation of Baton Rouge, La. Suitable polyamine curatives, which include both primary and secondary amines, preferably have molecular weights ranging from about 64 to about 2000.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl)ether; hydroquinone-di-(β-hydroxyethyl) ether; and mixtures thereof. Preferred hydroxy-terminated curatives include ethylene glycol; diethylene glycol; 1,4-butanediol; 1,5-pentanediol; 1,6-hexanediol, trimethylol propane, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

It should also be understood that slow-reacting amine curatives, such as VERSALINK P-250™, VERSALINK P-650™, and POLAMINE™, and fast-reacting curatives, such as ETHACURE 100™ and ETHACURE 300™, may be used individually or as mixtures. Further, blending of these curatives, and/or varying the mixing temperature and speed, for example, can adjust the cure rate as desired. Light stable polyurethanes, such as those disclosed in U.S. patent application Ser. No. 09/812,910, filed Mar. 20, 2001, are also suitable for the layers of the present invention; the disclosure of this application is incorporated herein in its entirety by express reference hereto.

Any method known to one of ordinary skill in the art may be used to combine the polyisocyanate, polyol, and curing agent of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition.

Optionally, in addition to the cover and core layers, the golf ball according to the invention can contain one or more barrier layers. The one or more barrier layers, when present, can advantageously prevent or minimize the penetration of moisture, typically water vapor, into the core layer(s) of the golf ball. In one embodiment, the one or more barrier layers is/are a moisture vapor barrier, preferably disposed immediately around the core layer(s) of the golf ball. Also when present, the moisture vapor barrier layer(s) preferably has(have) a moisture vapor transmission rate that is lower than that of the cover layer(s), and also preferably less than the moisture vapor transmission rate of an ionomer resin such as Surlyn®, which is in the range of about 0.45 to about 0.95 grams·mm/m$^2$·day. The moisture vapor transmission rate is defined as the mass of moisture vapor that diffuses into a material of a given thickness per unit area per unit time. The preferred standards of measuring the moisture vapor transmission rate include ASTM F1249-90 entitled "Standard Test Method for Water Vapor Transmission Rate Through Plastic Film and Sheeting Using a Modulated Infrared Sensor," and ASTM F372-99 entitled "Standard Test Method for Water Vapor Transmission Rate of Flexible Barrier Materials Using an Infrared Detection Technique," among others.

In some embodiments, the one or more barrier layers can include a multi-layer thermoplastic film, a blend comprising ionomers, polyvinyl alcohol copolymer and polyamides, or a dispersion of acid salts of polyetheramines. Additionally or alternately, the one or more barrier layers can include nano particles, flaked-metals, such as mica, iron oxide and aluminum, or ceramic particles disposed in the film to resist the transmission of moisture.

In one embodiment, the water vapor barrier layer(s) contain polysulfide rubber. Polysulfide rubber typically has a high sulphur content, which makes the material resistant to hydrocarbons, gasoline, diluted acids, alkaline, water, alcohol, acetone, esters, among other things. Polysulfide is also highly resistant to diffusion of gases. According to one estimate, polysulfide is 40 times less permeable to vapor than natural rubber. The water vapor transmission rate for polysulfide is typically in the range of about 0.01 grams·mm/m$^2$·day to about 0.50 grams·mm/m$^2$·day. The water vapor transmission rate depends on the particular composition of the polysulfide compound, including functionality, molecular weight, curatives and fillers, among other things. For example, an isocyanate functionalized polysulfide generally has higher water vapor transmission rate and a relatively purer, high molecular weight polysulfide generally has lower water vapor transmission rate.

Other suitable moisture vapor barrier layers/materials are described in commonly-assigned patent publications, such as U.S. Pat. Nos. 6,632,147, 6,838,028, and 6,932,720; U.S. Patent Application Publication Nos. 2003/0069082, 2003/0069085, 2003/0130062, 2004/0048688, 2004/0185963, 2004/0147344, 2005/0164810, and 2005/0227786; and U.S. application Ser. No. 11/273,056, filed Nov. 14, 2005.

A variety of conventional components can be added to the cover compositions of the present invention. These include, but are not limited to, white pigment such as TiO$_2$, ZnO, optical brighteners, surfactants, processing aids, foaming agents, density-controlling fillers, UV absorbers/stabilizers, and light stabilizers. Suitable UV absorbers and light stabilizers can include, but are not limited to, TINUVIN® 328, TINUVIN® 213, TINUVIN® 765, TINUVIN® 770, and TINUVIN® 622. A preferred UV absorber is TINUVIN®

328, and a preferred light stabilizer is TINUVIN® 765. TINUVIN® products are commercially available from Ciba-Geigy. Dyes, as well as optical brighteners and fluorescent pigments may also be included in the golf ball covers according to the present invention. Such additional ingredients may be added in any amounts that will achieve their desired purpose.

Depending on the desired properties, balls prepared according to the invention can exhibit substantially the same or higher resilience, or coefficient of restitution ("COR"), with a decrease in compression or modulus, compared to balls of conventional construction. Additionally, balls prepared according to the invention can also exhibit substantially higher resilience, or COR, without an increase in compression, compared to balls of conventional construction. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the layers should be less than about 50,000 N/m at about −50° C.; preferably, the dynamic stiffness should be between about 10,000 and 40,000 N/m at about −50° C.; more preferably, the dynamic stiffness should be between about 20,000 and about 30,000 N/m at about −50° C.

The resultant golf balls typically have a coefficient of restitution of greater than about 0.7, preferably greater than about 0.75, and more preferably greater than about 0.78. The golf balls also typically have an Atti compression of at least about 40, preferably from about 50 to 120, and more preferably from about 60 to 100.

When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272-98, Procedure B, is typically greater than about 500 psi, and is preferably from about 500 psi to 150,000 psi. In one embodiment, the material of the outer cover layer has a material hardness of less than about 45 Shore D, preferably less than about 40 Shore D, more preferably between about 25 and about 40 Shore D, and most preferably between about 30 and about 40 Shore D.

The golf balls according to the invention can generally exhibit a flexural modulus from about 10,000 psi to about 100,000 psi, preferably from about 20,000 psi to about 75,000 psi, or also preferably from about 25,000 psi to about 65,000 psi. Additionally or alternately, the one or more core layers, collectively and/or individually, can advantageously exhibit a flexural modulus from about 20,000 psi to about 35,000 psi and/or a hardness from about 45 to about 55 Shore D. Additionally or alternately, the one or more cover layers, collectively and/or individually, can advantageously exhibit a flexural modulus from about 50,000 psi to about 80,000 psi and/or a hardness of not more than about 60 Shore D.

Hardness is preferably measured pursuant to ASTM D-2240 in either button or slab form on the Shore D scale. More specifically, Shore D scale measures the indentation hardness of a polymer. The higher Shore D value indicates higher hardness of the polymer. Compression is measured by applying a spring-loaded force to the golf ball center, golf ball core or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus, softer, more compressible materials will have lower Atti gauge values than harder, less compressible materials. Compression measured with this instrument is also referred to as PGA compression. The approximate relationship that exists between Atti or PGA compression and Riehle compression can be expressed as:

(Atti or PGA compression)=(160-Riehle Compression).

The present golf ball can have an overall diameter of any size. Although the United States Golf Association ("USGA") specifications limit the minimum size of a competition golf ball to 1.680 inches. There is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

Unless otherwise expressly specified, all of the numerical ranges, amounts, values and percentages, such as those for amounts of materials and others in the specification, may be read as if prefaced by the word "about", even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth herein are reported as precisely as possible. Any numerical value, however, may inherently contain certain errors resulting from the standard deviation found in measurements obtained from their respective testing methods. Furthermore, where numerical ranges of varying scope are set forth herein, it is contemplated that any combination of the values that is inclusive of the recited values may be used.

EXAMPLES

Example 1

A golf ball in accordance with the present invention has a diameter of about 1.68 inches and weighs about 1.62 ounces. The ball of Example 1 comprises a core and a cover with a velocity-reduced layer disposed therebetween. The velocity-reduced layer has a thickness of at least 0.003 inch (or less if latex is used), preferably from about 0.003 inch to about 0.040 inch, more preferably from about 0.005 inch to about 0.030 inch, most preferably from about 0.005 inch to about 0.020 inch.

The velocity-reduced layer between the cover and the core comprises a centipede ionomer that can be made as follows. Octylamine (about 1 kg) and ISOBAN-10™ poly(maleic anhydride-alt-isobutylene) (about 1.3 kg, commercially available from Kuraray Co., Ltd., of Tokyo, Japan) are mixed together at a temperature of about 80° C. for about 5 minutes. Thereafter, the temperature is increased to about 195° C., at a rate of about 3° C./minute, after which the mixing is performed isothermally at about 195° C. for about another 2 hours. For about 30 minutes, the temperature is adjusted to about 160° C. and the contents placed under vacuum. The centipede ionomer is then extruded through a ¼' (about 0.64 cm) die. More information about the making of this centipede ionomer can be found in U.S. Patent Application Publication No. 2002/0188064 A1. This centipede ionomer is then reprocessed, optionally with one or more other polymers and/or additives, to form the velocity-reduced layer.

The velocity-reduced layer may have any hardness, but preferably has a durometer measurement from about 5 Shore C to about 80 Shore D, more preferably from about 10 Shore C to about 95 Shore C.

The core of the golf ball is solid and a single-layer of 1.59 inches in diameter and is made from a conventional high resilience core of high cis-polybutadiene rubber with ZDA reactive co-agent and peroxide cross-linking agent. The cover of the golf ball is a single-layer ionomer that has a compression of about 90 and a CoR of about 0.810. When the velocity-reduced layer has a thickness of about 0.020 inch, and when the core is reduced to about 1.55 inch, the resulting CoR is no greater than 0.805 and preferably no greater than 0.800. In general, the golf ball has CoR in the range from about 0.500 to about 0.845, more preferably from about 0.600 to about 0.825, most preferably from about 0.650 to about 0.810.

Example 2

A golf ball in accordance with the present invention has a diameter of about 1.68 inches and weighs about 1.62 ounces. The ball of Example 2 comprises a core and a cover with a velocity-reduced layer disposed therebetween. The velocity-reduced layer has a thickness of at least 0.003 inch (or less if latex is used), preferably from about 0.003 inch to about 0.040 inch, more preferably from about 0.005 inch to about 0.030 inch, most preferably from about 0.005 inch to about 0.020 inch.

The velocity-reduced layer between the cover and the core comprises a centipede ionomer that can be made as follows. About 4 parts of the centipede ionomer of Example 1 is combined in a Brabender™ mixer with about 1 part of DTDP (ditridecylphthalate) oil at about 160° C. and about 60 rpm for about 15 minutes, after an initial mix of the centipede ionomer alone of about 3 minutes. The resulting centipede ionomer composition is then reprocessed, optionally with one or more other polymers and/or additives, to form the velocity-reduced layer. More information about the making of this centipede ionomer composition can be found in U.S. Patent Application Publication No. 2002/0188064 A1.

The velocity-reduced layer may have any hardness, but preferably has a durometer measurement from about 5 Shore C to about 80 Shore D, more preferably from about 10 Shore C to about 95 Shore C.

The core of the golf ball is solid and a single-layer of 1.59 inches in diameter and is made from a conventional high resilience core of high cis-polybutadiene rubber with ZDA reactive co-agent and peroxide cross-linking agent. The cover of the golf ball is a single-layer ionomer that has a compression of about 90 and a CoR of about 0.810. When the velocity-reduced layer has a thickness of about 0.020 inch, and when the core is reduced to about 1.55 inch, the resulting CoR is no greater than 0.805 and preferably no greater than 0.800. In general, the golf ball has CoR in the range from about 0.500 to about 0.845, more preferably from about 0.600 to about 0.825, most preferably from about 0.650 to about 0.810.

Example 3

A golf ball in accordance with the present invention has a diameter of about 1.68 inches and weighs about 1.62 ounces. The ball of Example 3 comprises a core and a cover with a velocity-reduced layer disposed therebetween. The velocity-reduced layer has a thickness of at least 0.003 inch (or less if latex is used), preferably from about 0.003 inch to about 0.040 inch, more preferably from about 0.005 inch to about 0.030 inch, most preferably from about 0.005 inch to about 0.020 inch.

The velocity-reduced layer between the cover and the core comprises a centipede ionomer that can be made as follows. About 8 parts of the centipede ionomer of Example 1 is combined in a Brabender™ mixer with about 2 parts of DTDP (ditridecylphthalate) oil at about 160° C. and about 60 rpm for about 5 minutes, after an initial mix of the centipede ionomer alone of about 3 minutes. Thereafter, about 1 part of 70% cobalt boron neodecanate in paraffin oil (commercially available as Manobond™-C by Rhone Poulenc) is added to the mixer, and the contents mixed for about another 12 minutes. The resulting centipede ionomer composition is then reprocessed, optionally with one or more other polymers and/or additives, to form the velocity-reduced layer. More information about the making of this centipede ionomer composition can be found in U.S. Patent Application Publication No. 2002/0188064 A1.

The velocity-reduced layer may have any hardness, but preferably has a durometer measurement from about 5 Shore C to about 80 Shore D, more preferably from about 10 Shore C to about 95 Shore C.

The core of the golf ball is solid and a single-layer of 1.59 inches in diameter and is made from a conventional high resilience core of high cis-polybutadiene rubber with ZDA reactive co-agent and peroxide cross-linking agent. The cover of the golf ball is a single-layer ionomer that has a compression of about 90 and a CoR of about 0.810. When the velocity-reduced layer has a thickness of about 0.020 inch, and when the core is reduced to about 1.55 inch, the resulting CoR is no greater than 0.805 and preferably no greater than 0.800. In general, the golf ball has CoR in the range from about 0.500 to about 0.845, more preferably from about 0.600 to about 0.825, most preferably from about 0.650 to about 0.810.

While the illustrative embodiments of the invention disclosed herein can fulfill any objectives stated above, it should be appreciated by those of skill in the art that numerous modifications and other embodiments may be devised. Therefore, it should be understood that the appended claims are intended to cover all such modifications and embodiments, which would come within the spirit and scope of the present invention.

What is claimed is:

1. A golf ball comprising one or more core layers and one or more cover layers, wherein at least one layer of the golf ball comprises a centipede polymer, and wherein the centipede polymer comprises a non-ionomeric poly(isoprene-g-styrene) centipede polymer.

2. The golf ball of claim 1, wherein the centipede polymer is present in one or more core layers.

3. The golf ball of claim 2, wherein the one or more core layers together have an outer diameter from about 1.50 inches to at least about 1.58 inches.

4. The golf ball of claim 2, wherein the golf ball comprises an inner core layer and an outer core layer, and wherein the centipede polymer is present in the outer core layer.

5. The golf ball of claim 1, wherein the golf ball additionally comprises an intermediate layer, and wherein the centipede polymer is present in an the intermediate layer.

* * * * *